(12) United States Patent
Elliott

(10) Patent No.: US 8,121,563 B1
(45) Date of Patent: Feb. 21, 2012

(54) CONFIGURABLE PATCH PANEL SYSTEM

(75) Inventor: Brig Barnum Elliott, Arlington, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 514 days.

(21) Appl. No.: 10/780,008

(22) Filed: Feb. 17, 2004

(51) Int. Cl.
*G06F 3/033* (2006.01)

(52) U.S. Cl. .................. 455/130; 370/315; 370/328

(58) Field of Classification Search .................. 455/508, 455/509, 130; 370/265, 329, 315, 328; 361/796; 379/413.01–413.03; 439/489, 676
See application file for complete search history.

(56) References Cited

U.S. PATENT DOCUMENTS

| | | | | |
|---|---|---|---|---|
| 4,751,697 | A * | 6/1988 | Hunter et al. | 370/400 |
| 4,926,495 | A * | 5/1990 | Comroe et al. | 455/508 |
| 5,185,796 | A * | 2/1993 | Wilson | 380/277 |
| H2079 | H * | 9/2003 | Menon et al. | 370/329 |
| 6,650,908 | B1 * | 11/2003 | Coombes et al. | 455/560 |
| 6,826,197 | B1 * | 11/2004 | Goode et al. | 370/466 |
| 6,831,901 | B2 * | 12/2004 | Millar | 370/315 |

* cited by examiner

*Primary Examiner* — Christian Hannon

(57) ABSTRACT

A patch panel system (100) includes interface units (120) and radio units (130). The interface units (120) connect to user devices (110) via corresponding ports. The radio units (130) are associated with radio channels. Combinations of the interface units (120) and the radio units (130) provide conversion of constant bit rate communication to packetized communication and reconversion of the packetized communication to the constant bit rate communication.

22 Claims, 6 Drawing Sheets

CONFIGURABLE PATCH PANEL SYSTEM

BACKGROUND OF THE INVENTION

1. Field of the Invention

The present invention relates generally to communication systems and, more particularly, to a configurable patch panel system that permits communication between devices.

2. Description of Related Art

Patch panels have been in existence for many years and still find use today. For example, military locations (e.g., sites, ships, submarines, etc.) have large numbers of existing (legacy) voice and data services that are carried over a wide variety of radio links. These voice and data services include services provided by specialized telephones, teletypewriters, etc. with wiring that runs to a "radio room." The wiring terminates in a patch panel within that room. From there, they can be flexibly connected to any of a number of existing radios. Thus, by appropriate connections at the patch panel, a certain device can connect to a given radio.

Currently, all of these connections are done by manual cabling. This restricts the locations at which connecting devices/radios can be located. This also makes it difficult to change large numbers of connections between the connecting devices and radios.

SUMMARY OF THE INVENTION

Systems and methods consistent with the principles of the invention provide a configurable patch panel system that connects any number of "plugs" or "connectors" to any number of transport channels (whether radio or wireline) via a packetized interconnection network.

In one aspect consistent with the principles of the invention, a patch panel system includes an interface unit and a radio unit. The interface unit includes a set of ports that are configured to connect to a set of user devices. The interface unit is configured to receive one or more analog signals from a user device via a port, generate a packet from the one or more analog signals, and transmit the packet. The radio unit is configured to receive the packet, convert the packet to a radio signal, and transmit the radio signal over a radio channel.

According to another aspect, a method for sending signals through a patch panel system that includes a set of ports and a set of channels is provided. The method includes providing a binding between a port and a channel, where the binding is based, at least in part, on addresses associated with the port and the channel. The method also includes receiving one or more analog signals at the port, generating a packet from the one or more analog signals, transmitting the packet based, at least in part, on the binding between the port and the channel, converting the packet to a signal for transmission over the channel, and transmitting the signal over the channel.

According to a further aspect, a patch panel system includes a radio unit and an interface unit. The radio unit is configured to receive one or more radio signals, generate a packet from the one or more radio signals, and transmit the packet. The interface unit includes a set of ports that are configured to connect to a set of user devices. The interface unit is configured to receive the packet, convert the packet to an analog signal, and output the analog signal to a user device via a port.

According to another aspect, a method for sending signals through a patch panel system that includes a set of ports and a set of channels is provided. The method includes providing a binding between a port and a channel, where the binding is based, at least in part, on addresses associated with the port and the channel. The method also includes receiving one or more signals over the channel, generating a packet from the one or more signals, transmitting the packet based, at least in part, on the binding between the port and the channel, converting the packet to an analog signal, and outputting the analog signal via the port.

According to yet another aspect, a patch panel system includes interface units and radio units. The interface units are configured to connect to user devices via corresponding ports. The radio units are associated with radio channels. Combinations of the interface units and the radio units provide conversion of constant bit rate communication to packetized communication and reconversion of the packetized communication to the constant bit rate communication.

According to a further aspect, a patch panel system includes interface units and radio units. The interface units are configured to connect to user devices via corresponding ports. The radio units are associated with radio channels. A port is assigned a first address corresponding to a radio channel and the radio channel is assigned a second address corresponding to the port. The first and second addresses create a binding between the port and the radio channel.

According to another aspect, a patch panel system includes interface units and radio units. The interface units are configured to connect to user devices via corresponding ports. The radio units are associated with radio channels. A port is assigned a first address corresponding to a radio channel and the radio channel is assigned a second address corresponding to the port. The first and second addresses are used to transmit packets between the port and the radio channel.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention provide a patch panel that may connect any number of "plugs" or "connectors" to any number of transport channels (whether radio or wireline) via a packetized communication medium. According to an exemplary implementation, the systems and methods may facilitate the communication of constant bit rate, streaming traffic, such as voice or teletypewriter traffic, across a packet transport network. The systems and methods may also facilitate the communication of specialized signaling information, such as the push-to-talk indication on a walkie-talkie style radio, along with the traffic itself.

Exemplary Patch Panel System

Figure 1:
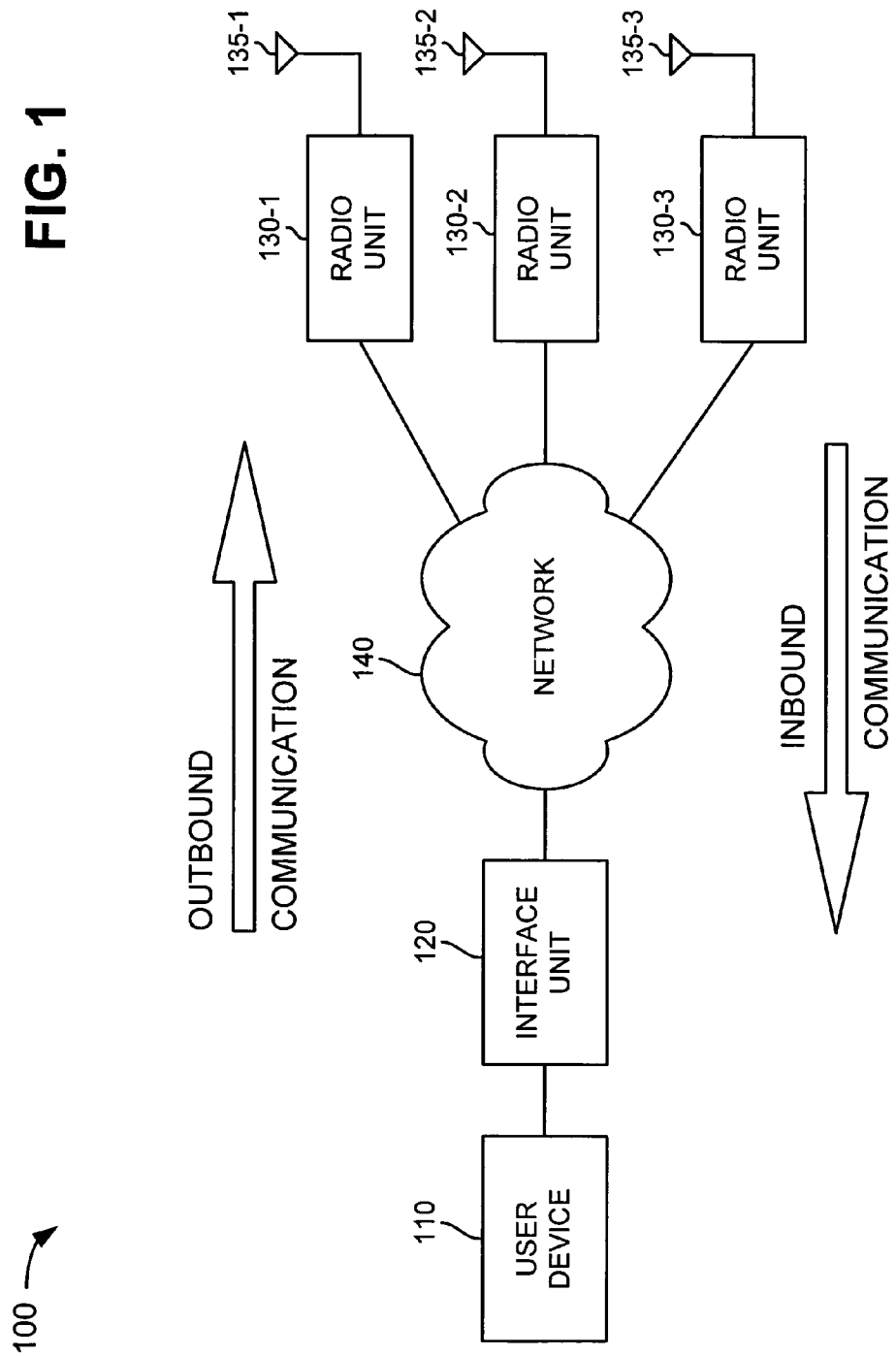
FIG. 1 is a block diagram of an exemplary system in which systems and methods consistent with the principles of the invention may be implemented.

FIG. 1 is a block diagram of an exemplary patch panel system 100 in which systems and methods consistent with the principles of the invention may be implemented. System 100 may include a user device 110 and an interface unit 120 connected to radio units 130-1 through 130-3 (collectively referred to as radio units 130) via a network 140. While a single user device 110, interface unit 120, and network 140, and three radio units 130 are shown in FIG. 1, a typical network 100 may include more or fewer of these items.

User device 110 may include an analog or digital communication device, such as a telephone, a teletypewriter, a facsimile machine, an information exchange system, an enhanced position location and reporting system, Link 16 equipment, a digitized video device, a printer, a modem, a hub, a private branch exchange, a digital switch, a naval tactical data system, a miniature terminal, and an airborne terminal, or another type of communication device. In some situations, user device 110 may be used to transmit or receive classified (secret) information. In other situations, user device 110 may be used to transmit or receive unclassified information.

Interface unit 120 may include a patch panel that permits one or more user devices 110 to communicate over one or more radio channels. The patch panel may provide bindings between "plugs" or "connectors" to which user devices 110 may connect (also called "interface ports" or simply "ports") and radio channels associated with radio units 130. A binding might be created by assigning an address associated with a particular radio channel to an interface port.

Interface unit 120 may offer a number of different types of plugs or connectors into which different types of user devices 110 may connect. A user device 110 may plug into, or connect to, interface unit 120 using a standard connection, such as a serial connection (e.g., RS-232, RS-422, RS-485, RS-530, etc.), a military standard 1553B connection, a firewire (e.g., IEEE 1394B) connection, a universal serial bus (USB) connection, or another type of standard connection.

Radio units 130 may facilitate communication over radio channels. Each radio unit 130-$x$ (where $1 \leq x \leq 3$) may communicate over one or more radio channels via one or more associated antennas 135. While each of radio units 130 is illustrated as having an associated antenna 135, this need not be the case. For example, one or more of radio units 130 may communicate via wireline connections rather than, or in addition to, wireless connections.

Each radio unit 130-$x$ may communicate over one or more different types of communication channels. There may be many different types of radio channels over which radio units 130 may communicate. For example, the radio channels may include high frequency channels, very high frequency channels, ultra high frequency channels, microwave links, satellite links, narrowband channels, and/or wideband channels. The manner in which information is encoded on these channels may vary, as may the kinds of traffic that can be conveyed across these channels. For example, some channels may only be capable of carrying a single voice conversation, others may be capable of carrying specific kinds of teletypewriter data, and so forth.

Radio units 130 may communicate with interface unit 120 over network 140 using packets. Radio units 130 may provide bindings between their associated radio channels and the ports of one or more interface units 120. A binding might be created by assigning an address associated with a particular interface port to a radio channel.

Network 140 may include any packet transport network, such as an Ethernet switch, the Internet, an intranet, a virtual private network, a local area network, a wide area network, etc. In one implementation, network 140 includes a single network. In another implementation, network 140 includes a combination of networks. Packetized information may be conveyed between interface unit 120 and radio units 130 through network 140 using the well known Real-Time Protocol (RTP). Other well known "streaming media" protocols may also be used to convey the packetized information, such as the H.323 protocol suite, the AAL2 protocol, asynchronous transfer method protocols, or other types of protocols. Alternatively, special purpose protocols may be used to convey the information.

With reference to FIG. 1, "outbound communication" refers to communication in the direction from interface unit 120 to a radio unit 130-$x$ through network 140. On the other hand, "inbound communication" refers to communication in the direction from radio unit 130-$x$ to interface unit 120 through network 140.

Exemplary Interface Unit

Figure 2:
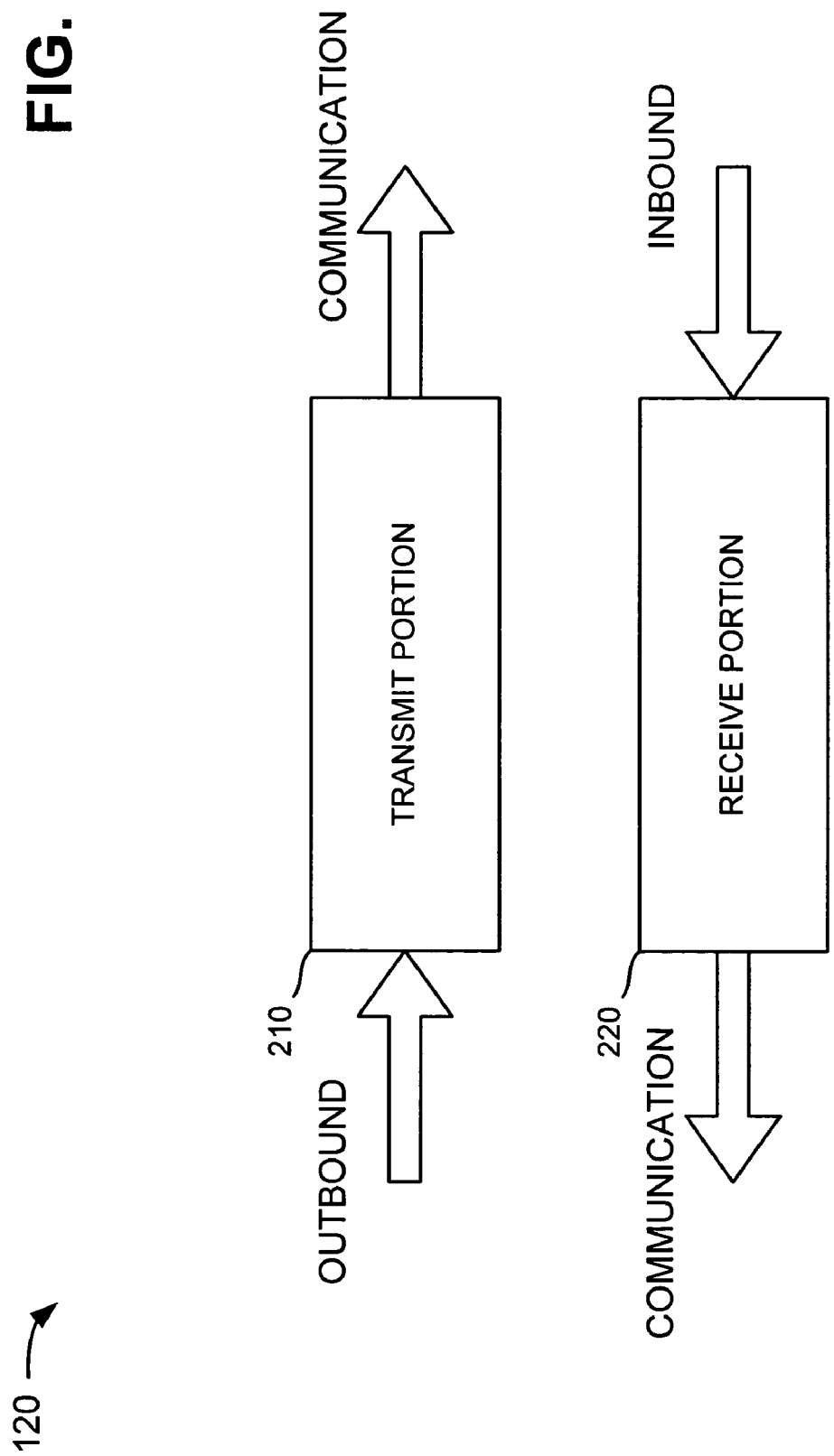
FIG. 2 is an exemplary functional block diagram of a portion of the interface unit of FIG. 1 according to an implementation consistent with the principles of the invention.

FIG. 2 is an exemplary functional block diagram of a portion of interface unit 120 according to an implementation consistent with the principles of the invention. According to one aspect consistent with the principles of the invention, the functions described with respect to FIG. 2 may be implemented as instructions stored in a memory and executed by a processor within interface unit 120. According to another aspect, these functions may be implemented as hardware, firmware, or a combination of hardware, firmware, and/or software within interface unit 120.

As illustrated in FIG. 2, interface unit 120 may include a transmit portion 210 for communicating in the outbound direction and a receive portion 220 for communicating in the inbound direction. Transmit portion 210 may receive one or more signals (e.g., one or more analog signals) from a user device 110, digitize the signal(s) to obtain bit representations, and store the bit representations in a memory. For example, transmit portion 210 may sample voltages of one or more incoming signals and interpret the meaning of the sampled voltages to obtain the bit representations.

Transmit portion 210 may determine when a sufficient number of bits have been stored in memory to fill the payload portion of a packet. When enough bits have been stored, transmit portion 210 may form a packet and add header information (e.g., Internet Protocol (IP) header information) and/or framing information (e.g., Ethernet framing information) to the packet. Either the packet's header or framing information, or both, may be used to identify a destination radio channel for the packet by including the relevant address and radio channel number in the header and/or framing information. In one exemplary implementation, the framing information may identify a particular one of radio units 130 and the header information may identify a particular radio channel that should be used by the identified radio unit. Transmit portion 210 may then transmit the packet to network 140, which may forward the packet to the identified radio unit based, at least in part, on the header and/or framing information associated with the packet.

Transmit portion 210 may also include signaling information, as needed, with the packets. Such signaling information may be received in out-of-band channels, such as an extra set of communication channels (e.g., wires) that carry some voltage when a given condition is present (e.g., push-to-talk has been pressed). Alternatively, such signaling information may be carried along the same communication channels as the traffic itself (e.g., by imposing a further level of modulation on those channels). In either case, transmit portion 210 may recognize the signaling information, encode it appropriately, and transmit it with the packet to network 140.

Receive portion 220 may receive a packet from one of radio units 130 via network 140. Receive portion 220 may depacketize the packet to, for example, extract a set of bits from the packet, such as the bits that comprise the payload portion of the packet, and store the bits in a memory. The bits may represent a continuous stream of bits to be transmitted. Receive portion 220 may then convert the bits, as necessary, into a signal (e.g., an analog signal, such as an analog voice waveform), and transmit the signal to a user device 110.

Exemplary Radio Unit

Figure 3:
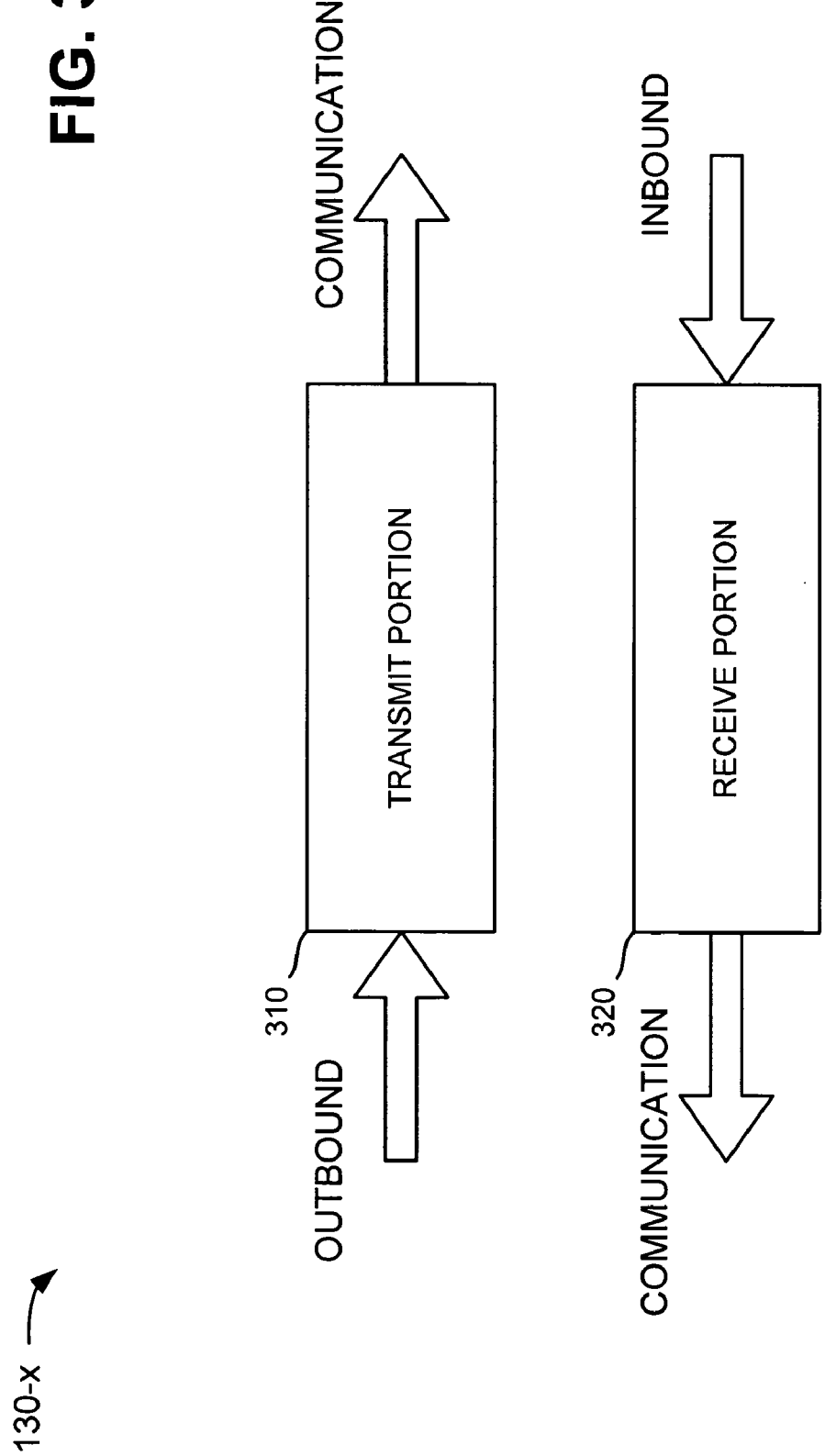
FIG. 3 is an exemplary functional block diagram of a portion of a radio unit of FIG. 1 according to an implementation consistent with the principles of the invention.

FIG. 3 is an exemplary functional block diagram of a portion of a radio unit 130-*x* according to an implementation consistent with the principles of the invention. According to one aspect consistent with the principles of the invention, the functions described with respect to FIG. 3 may be implemented as instructions stored in a memory and executed by a processor within radio unit 130-*x*. According to another aspect, these functions may be implemented as hardware, firmware, or a combination of hardware, firmware, and/or software within radio unit 130-*x*.

As illustrated in FIG. 3, radio unit 130-*x* may include a transmit portion 310 for communicating in the outbound direction and a receive portion 320 for communicating in the inbound direction. Transmit portion 310 may receive a packet from interface unit 120 via network 140. Transmit portion 310 may depacketize the packet into a set of bits and store the bits in memory. The bits may represent a continuous stream of bits to be transmitted. If necessary, transmit portion 310 may encrypt the bits. Transmit portion 310 may then convert the bits, as necessary, into a radio signal (e.g., an amplitude or frequency modulated waveform) and transmit the signal over a radio channel.

Receive portion 320 may receive one or more radio signals transmitted over an associated radio channel. Receive portion 320 may digitize the signal(s) to obtain bit representations and store the bit representations in memory. For example, receive portion 320 may sample voltages of the radio signal(s) and interpret the meaning of the sampled voltages to obtain the bit representations. If necessary, receive portion 320 may decrypt the bits.

Receive portion 320 may determine when a sufficient number of bits have been stored in memory to fill the payload portion of a packet. When enough bits have been stored, receive portion 320 may form a packet and add header information (e.g., IP header information) and/or framing information (e.g., Ethernet framing information) to the packet. Either the packet's header or framing information, or both, may be used to identify interface unit 120 and/or an interface port within interface unit 120 for the packet by including the relevant address and port number in the header and/or framing information. In one exemplary implementation, the framing information may identify a particular interface unit 120 and the header information may identify a particular port within the identified interface unit. Receive portion 320 may then transmit the packet to network 140, which may forward the packet to the identified interface unit based, at least in part, on the header and/or framing information associated with the packet.

Receive portion 320 may also include signaling information, as needed, with the packets. Such signaling information may be received in out-of-band channels, such as an extra set of communication channels that carry some voltage when a given condition is present (e.g., push-to-talk has been pressed). Alternatively, such signaling information may be carried along the same communication channels as the traffic itself (e.g., by imposing a further level of modulation on those channels). In either case, receive portion 320 may recognize the signaling information, encode it appropriately, and transmit it with the packet to network 140.

Exemplary Processing

Figure 4:
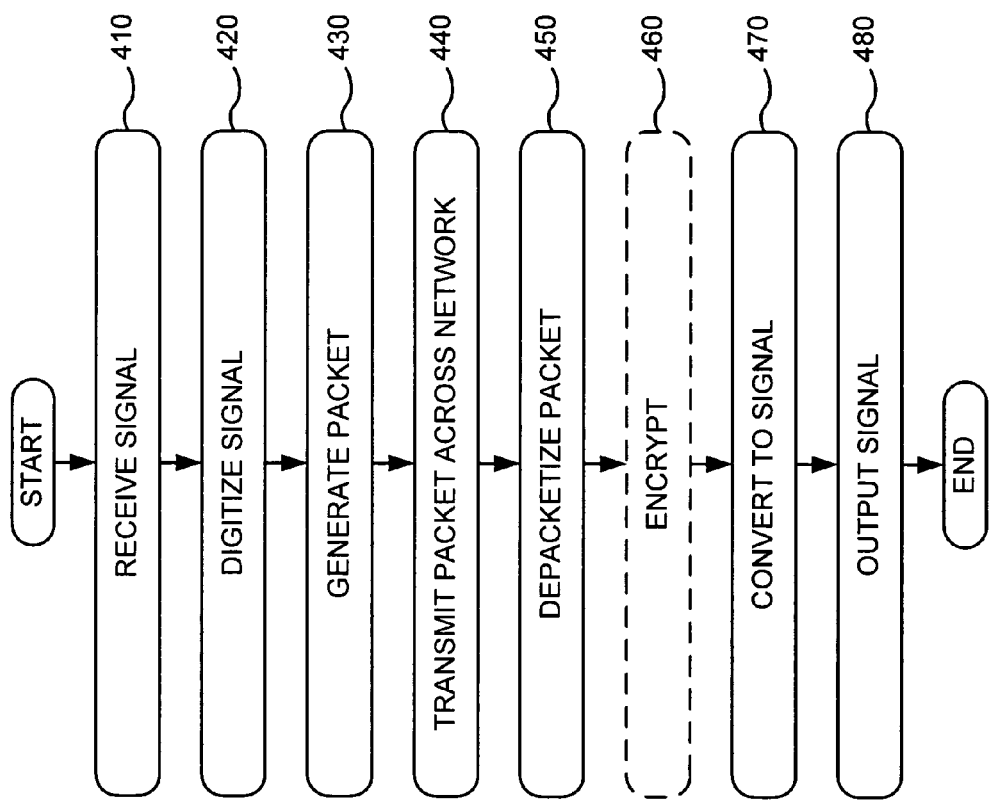
FIG. 4 is a flowchart of exemplary processing for communicating in an outbound direction according to an implementation consistent with the principles of the invention.

FIG. 4 is a flowchart of exemplary processing for communicating in the outbound direction according to an implementation consistent with the principles of the invention. Processing may begin with user device 110 (FIG. 1) outputting one or more signals (e.g., one or more analog signals) for transmission via one of radio units 130. Assume that the transmission requires a very high frequency radio channel and that radio unit 130-1 offers communication over such a channel.

Interface unit 120 may receive the signal(s) from user device 110 and digitize the signal(s) to obtain bit representations (acts 410 and 420). Interface unit 120 may store the bit representations in memory and determine when a sufficient number of bits have been stored in memory to fill the payload portion of a packet. When enough bits have been stored, interface unit 120 may generate a packet using the bits in memory for the payload portion (act 430). Interface unit 120 may add header information and/or framing information to identify radio unit 130-1 and/or the very high frequency radio channel over which the signal from user device 110 is to be transmitted.

Interface unit 120 may also include signaling information, if applicable, with the packet (either as part of the packet or accompanying the packet). As described above, such signaling information may be received in one or more out-of-band channels or carried along the same communication channel as the signal itself. Interface unit 120 may recognize the signaling information and encode it appropriately.

Interface unit 120 may then transmit the packet (with signaling information, if applicable) to radio unit 130-1 via network 140 (act 440). Network 140 may route the packet to radio unit 130-1 using conventional packet routing techniques.

Radio unit 130-1 may receive the packet and determine from the packet's header and/or framing information that the packet is to be transmitted via a very high frequency radio channel. Radio unit 130-1 may then depacketize the packet into a set of bits and store the bits in memory (act 450). The bits may represent a continuous stream of bits corresponding to the original signal(s) output by user device 110. If necessary, radio unit 130-1 may encrypt the bits (act 460). Radio unit 130-1 may then convert the bits, as necessary, into a radio signal for transmission over the very high frequency radio channel (act 470). Radio unit 130-1 may then transmit the signal over the radio channel (act 480).

Figure 5:
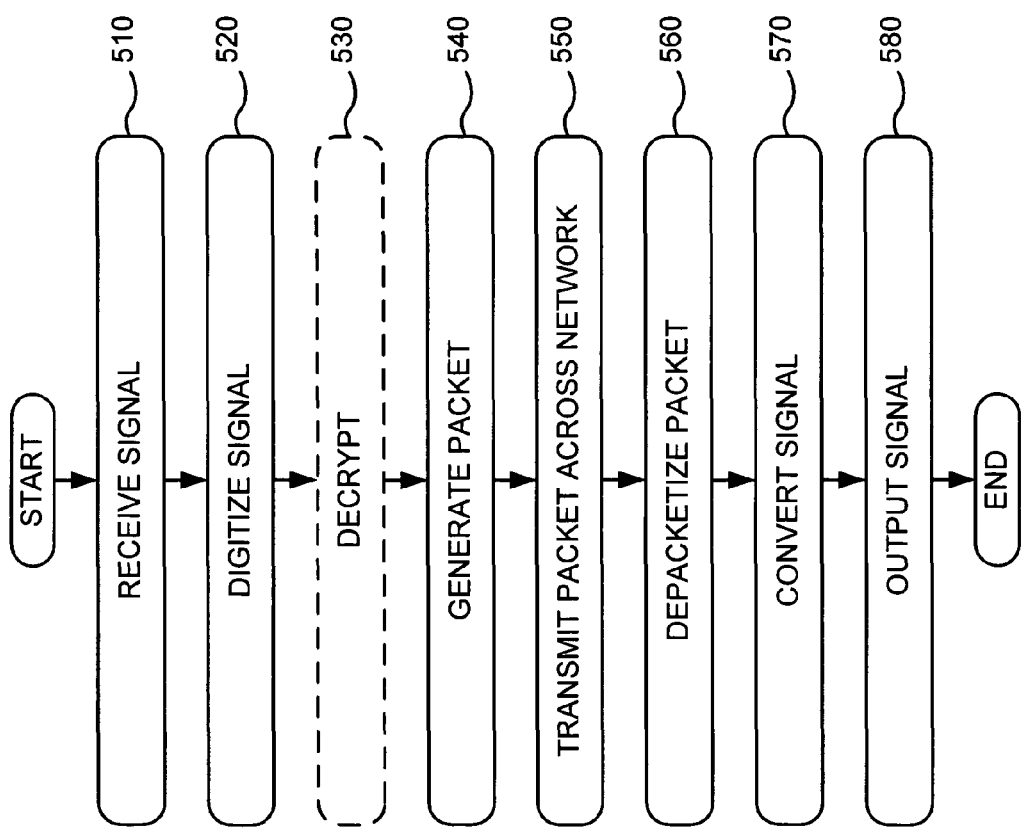
FIG. 5 is a flowchart of exemplary processing for communicating in an inbound direction according to an implementation consistent with the principles of the invention.

FIG. 5 is a flowchart of exemplary processing for communicating in the inbound direction according to an implementation consistent with the principles of the invention. Processing may begin with one of radio units 130, such as radio unit 130-1, receiving one or more radio signals intended for user device 110 over an associated radio channel (act 510).

Radio unit 130-1 may then digitize the signal(s) to obtain bit representations and store the bit representations in memory (act 520). If necessary, radio unit 130-1 may decrypt the bits (act 530). Radio unit 130-1 may determine when a sufficient number of bits have been stored in memory to fill the payload portion of a packet. When enough bits have been stored, radio unit 130-1 may form a packet using the bits in memory for the payload portion and add header and/or framing information to the packet (act 540). As described above, the header and/or framing information may identify an interface unit 120 and/or an interface port.

Radio unit 130-1 may also include signaling information, if applicable, with the packet (either as part of the packet or accompanying the packet). As described above, such signaling information may be received in one or more out-of-band channels or carried along the same communication channel as the radio signal itself. Radio unit 130-1 may recognize the signaling information and encode it appropriately.

Radio unit 130-1 may then transmit the packet (with signaling information, if applicable) to interface unit 120 via network 140 (act 550). Network 140 may route the packet to interface unit 120 using conventional packet routing techniques.

Interface unit 120 may receive the packet and determine from the packet's header and/or framing information that the packet is intended for a particular port and, thus, a particular user device 110. Interface unit 120 may depacketize the packet and store the bit representations in memory (act 560). The bits may represent a continuous stream of bits corresponding to the radio signal(s) received by radio unit 130-1. Interface unit 120 may then convert the bits, as necessary, into an appropriate signal (e.g., an analog signal) and output the signal to user device 110 (acts 570 and 580).

Exemplary Binding Management

In one implementation consistent with the principles of the invention, interface unit 120 and/or radio units 130 are configured to provide static (non-computer controlled) bindings between interface ports and radio channels. In an alternative implementation, interface unit 120 and/or radio units 130 are configured to provide dynamic (computer controlled) bindings between interface ports and radio channels.

Figure 6:
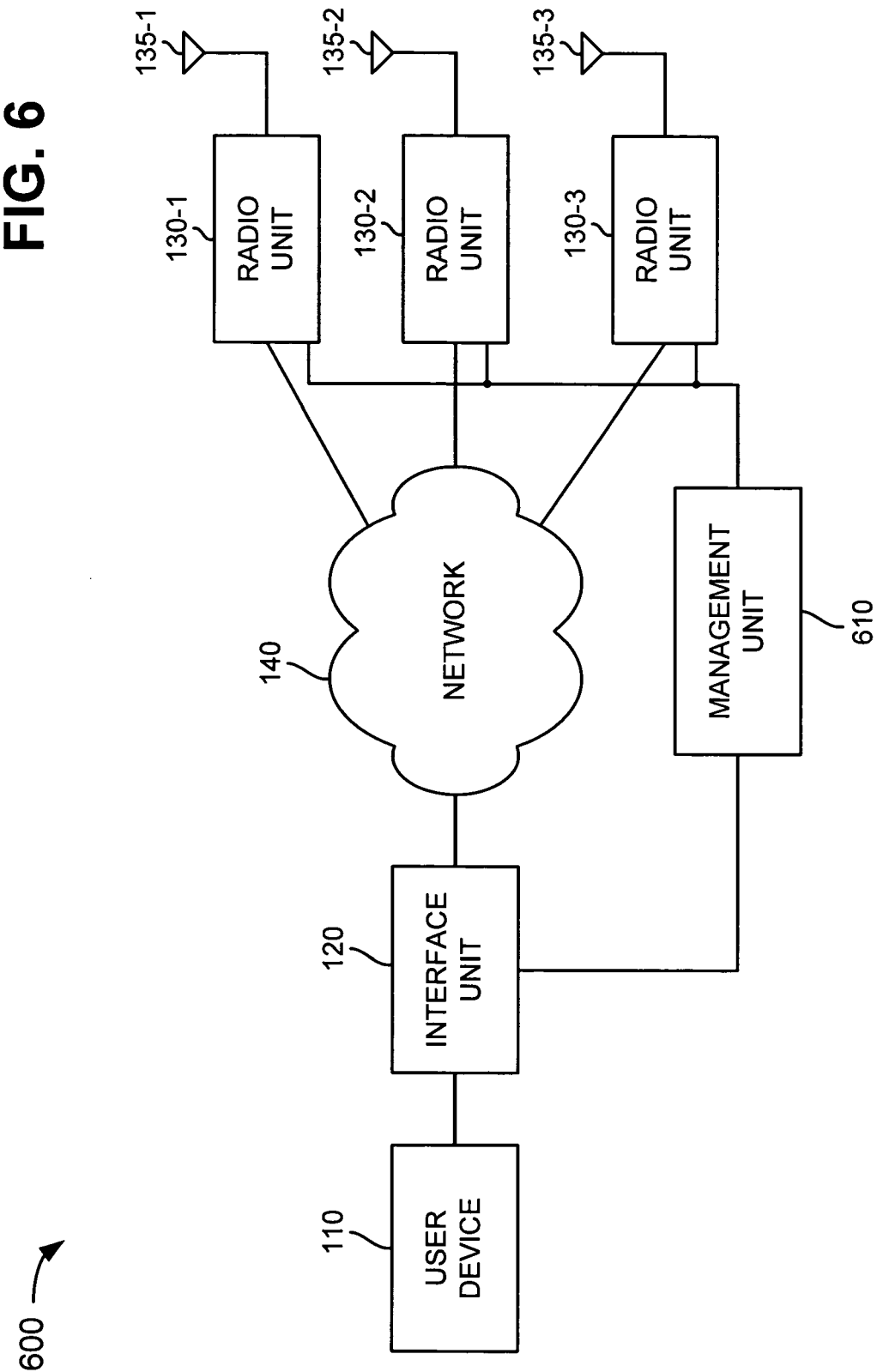
FIG. 6 is a block diagram of another exemplary system in which systems and methods consistent with the principles of the invention may be implemented.

FIG. 6 is a block diagram of an exemplary patch panel system 600 in which systems and methods may be implemented in this alternative implementation. In addition to the items in system 100 (FIG. 1), system 600 includes a management unit 610. While a single management unit 610 is shown in FIG. 6, a typical system 600 may have additional management units 610. Also, while management unit 610 is shown connected directly to interface unit 120 and radio units 130, management unit 610 may alternatively connect to interface unit 120 and/or radio units 130 via network 140.

Management unit 610 may include a computer device that may be used to reconfigure an interface unit, such as interface unit 120, to change the bindings between the interface ports and the radio channels. To accomplish this, management unit 610 may assign a new address to an interface port so that the port points to a different radio channel. Management unit 610 may also be used to reconfigure a radio unit 130-x. In this case, management unit 610 may assign a new address to a radio channel so that the channel points to a different interface port associated with the same or a different interface unit 120.

Management unit 610 may communicate these changes to interface unit 120 and/or radio unit 130-x via any standard protocol. For example, management unit 610 might use the Simple Network Management Protocol (SNMP), the Hypertext Transport Protocol (HTTP), the Extensible Markup Language (XML), or another type of specialized protocol.

CONCLUSION

Systems and methods consistent with the principles of the invention provide mechanisms by which a patch panel can be implemented using modern packetized communication. The patch panel may provide a front panel into which devices may plug, conversion between legacy constant bit rate services and modern packetized services, such as IP over Ethernet frames, switching of these packets to their destination, and reconversion to constant bit rate services at the intended destination. The patch panel may also facilitate the communication of specialized signaling information, such as the push-to-talk indication on a walkie-talkie style radio, along with the constant bit rate traffic itself.

Such a patch panel may be computer controlled to permit changes in the interconnections between user devices and radio units to be made rapidly and efficiently. It also permits the user devices and radio units to be located at any distance apart since they are no longer connected by physical cables. Because the patch panel provides a packetized connection between the user devices and radio units rather than a physical wireline connection, the user devices and radio units may be located as far apart as necessary (even on the other side of the world).

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 4 and 5, the order of the acts may differ in other implementations consistent with the principles of the invention. Moreover, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:
1. A patch panel system, comprising:
an interface unit that includes a plurality of ports configured to connect to a plurality of user devices, the interface unit being configured to:

receive one or more analog signals output from a user device of the plurality of user devices via a port of the plurality of ports, generate a packet from the one or more analog signals, and transmit the packet; and a radio unit configured to:

receive the packet, convert the packet to a depacketized radio signal representing only extracted payload bits, and transmit the depacketized radio signal representing only extracted payload bits over a radio channel;

wherein said user device is selected from a group of user devices consisting of a telephone, a teletypewriter, a facsimile machine, an information exchange system, an enhanced position location and reporting system, link 16 equipment, a digitized video device, a printer, a modem, a hub a private branch exchange, a digital switch, a naval tactical data system, a miniature terminal and an airborne terminal.

2. The system of claim 1, wherein the one or more analog signals are associated with a constant bit rate service.

3. The system of claim 1, wherein the interface unit includes a plurality of interface units each connected to a plurality of user devices and the radio unit includes a plurality of radio units configured to communicate over a plurality of types of radio channels.

4. The system of claim 1, wherein the ports include a plurality of different types of ports configured to connect to a plurality of different types of user devices.

5. The system of claim 1, wherein when generating a packet from the one or more analog signals, the interface unit is configured to:

digitize the one or more analog signals to obtain bit representations corresponding to the one or more analog signals, use the bit representations for a payload portion of the packet, and add header or framing information to the packet that identifies at least one of the radio unit and the radio channel.

6. The system of claim 5, wherein when adding header or framing information to the packet, the interface unit is configured to add Internet Protocol header information to the packet.

7. The system of claim 5, wherein when adding header or framing information to the packet, the interface unit is configured to add Ethernet framing information to the packet.

8. The system of claim 1, wherein the radio signal includes one of an amplitude modulated waveform and a frequency modulated waveform.

9. The system of claim 1, wherein the radio unit is further configured to depacketize the packet to obtain depacketized information; and wherein when converting the packet to a radio signal, the radio unit is configured to convert the depacketized information to a radio signal.

10. The system of claim 1, wherein the radio unit is further configured to encrypt bits associated with the packet.

11. The system of claim 1, where a binding exists between the port and the radio channel.

12. The system of claim 11, further comprising:

a management unit configured to control the binding between the port and the radio channel.

13. The system of claim 1, wherein the radio unit includes a plurality of radio units with a plurality of associated radio channels, where a plurality of bindings exist between the ports of the interface unit and the radio channels associated with the radio units.

14. The system of claim 13, further comprising:

a management unit configured to control the bindings between the ports of the interface unit and the radio channels associated with the radio units.

15. The system of claim 14, wherein the management unit uses first addresses associated with the ports and second addresses associated with the radio channels to control the bindings between the ports and the radio channels, at least one of the first and second addresses being used to transmit the packet from the interface unit to the radio unit.

16. The system of claim 1, wherein the interface unit is further configured to:

receive signaling information, recognize the signaling information, and include the signaling information with the packet.

17. A patch panel system that includes a plurality of ports and a plurality of radio channels, comprising:

means for providing a binding between a port of the plurality of ports and a radio channel of the plurality of radio channels, the binding being based, at least in part, on addresses associated with the port and the radio channel;

means for receiving one or more analog signals output from a user device at the port;

means for generating a packet from the one or more analog signals;

means for transmitting the packet based, at least in part, on the address associated with the radio channel;

means for converting the packet to a depacketized radio signal representing only extracted payload bits; and means for transmitting the depacketized radio signal representing only extracted payload bits over the radio channel;

wherein said user device is selected from a group of user devices consisting of a telephone, a teletypewriter, a facsimile machine, an information exchange system, an enhanced position location and reporting system, link 16 equipment, a digitized video device, a printer, a modem, a hub, a private branch exchange, a digital switch, a naval tactical data system, a miniature terminal and an airborne terminal.

18. A method for sending signals through a patch panel system that includes a plurality of ports and a plurality of channels, the method comprising:

providing a binding between a port of the plurality of ports and a channel of the plurality of channels, the binding being based, at least in part, on addresses associated with the port and the channel;

receiving one or more analog signals output from a user device at the port;

generating a packet from the one or more analog signals;

transmitting the packet based, at least in part, on the binding between the port and the channel;

converting the packet to a depacketized signal representing only extracted payload bits for transmission over the channel; and transmitting the depacketized signal representing only extracted payload bits over the channel;

wherein said user device is selected from a group of user devices consisting of a telephone, a teletypewriter, a facsimile machine, an information exchange system, an enhanced position location and reporting system, link 16 equipment, a digitized video device, a printer, a modem, a hub, a private branch exchange, a digital switch, a naval tactical data system, a miniature terminal and an airborne terminal.

19. A patch panel system, comprising:
a first interface unit that includes a plurality of first ports configured to connect to a plurality of first user devices, the first interface unit being configured to:
   receive one or more first analog signals output from a first user device of the plurality of first user devices via a first port of the plurality of first ports,
   generate a first packet from the one or more first analog signals, and
   transmit the first packet;
a first radio unit configured to:
   receive the first packet,
   convert the first packet to a first depacketized radio signal representing only extracted first payload bits, and
   transmit the first depacketized radio signal representing only extracted first payload bits over a first radio channel;
a second radio unit configured to:
   receive one or more second depacketized radio signals representing only extracted second payload bits,
   generate a second packet from the one or more second depacketized radio signals representing only extracted second payload bits, and
   transmit the second packet; and
a second interface unit that includes a plurality of second ports configured to connect to a plurality of second user devices, the second interface unit being configured to:
   receive the second packet,
   convert the second packet to a second analog signal, and
   output the second analog signal to a second user device of the plurality of second user devices via a second port of the plurality of second ports;
wherein said first and second user devices are selected from a group of user devices consisting of a telephone, a teletypewriter, a facsimile machine, an information exchange system, an enhanced position location and reporting system, link 16 equipment, a digitized video device, a printer, a modem, a hub, a private branch exchange, a digital switch, a naval tactical data system, a miniature terminal and an airborne terminal.

20. The system of claim 19, wherein the first and second interface units include a same interface unit.

21. The system of claim 19, wherein the first and second radio units include a same radio unit.

22. A system, comprising:
a patch panel interface unit that includes a plurality of ports configured to connect to a plurality of user devices, the interface unit being configured to:
   receive one or more signals output from a user device of the plurality of user devices via a port of the plurality of ports,
   generate a packet from the one or more signals, and
   transmit the packet; and
a radio unit configured to:
   receive the packet,
   convert the packet to a depacketized radio signal, and
   transmit the depacketized radio signal over a radio channel;
wherein said user device is selected from said plurality of mouser devices consisting of a telephone, a teletypewriter, a facsimile machine, an enhanced position location and reporting system, link 16 equipment, a printer, a modem, a private branch exchange, a naval tactical data system, a miniature terminal and an airborne terminal.

\* \* \* \* \*